| United States Patent [19] | [11] Patent Number: 5,064,700 |
| Yasue et al. | [45] Date of Patent: Nov. 12, 1991 |

[54] BLOW MOLDED NYLON 46 PRODUCT

[75] Inventors: Kenji Yasue; Toshio Tsuji; Takashi Ida; Shigeru Hayase, all of Uji, Japan

[73] Assignee: Stamicarbon B.V., AC Geleen, Netherlands

[21] Appl. No.: 424,105

[22] Filed: Oct. 20, 1989

[30] Foreign Application Priority Data

Oct. 22, 1988 [JP] Japan ................. 63-266648

[51] Int. Cl.$^5$ ............................................. F16L 1/08
[52] U.S. Cl. .................................. 428/36.92; 525/66; 525/183; 525/184
[58] Field of Search ............... 428/36.92; 525/66, 183, 525/184

[56] References Cited

U.S. PATENT DOCUMENTS 4,804,707  2/1989  Okamoto et al. .................... 525/66

Primary Examiner—Ellis P. Robinson
Assistant Examiner—J. Weddington
Attorney, Agent, or Firm—Cushman, Darby & Cushman

[57] ABSTRACT

The invention is related to blow-molded nylon products comprising 40-95 parts by weight nylon 46, 3-40 parts by weight nylon 6, nylon 66 and/or nylon 6/66 and 2-40 parts by weight of an acid or epoxy modified polyolefin. Blow moldability and impact resistance are improved without deterioration of high temperature resistance and mechanical strength.

12 Claims, No Drawings

BLOW MOLDED NYLON 46 PRODUCT

The present invention relates to a blow molded nylon 46 product having improved moldability and impact resistance. More particularly, it relates to a blow molded nylon 46 product having excellent impact resistance and heat resistance with an improved melt viscosity characteristic.

Nylon 46 is a known nylon. For example, U.S. Pat. Nos. 4,408,036 and 4,460,762 disclose processes for the production of nylon 46. Further, E. Roerdink and J. M. M. Warnier have described the properties of nylon 46 (Polymer, 26, p. 1582 (1985). It is also known that nylon 46 has excellent properties as an engineering plastic, particularly excellent heat resistance.

For example, the melting point of nylon 46 is 295° C., which is not only higher than 220° C. of nylon 6 or 260° C. of nylon 66 but also exceeds 285° C. of polyphenylenesulfide. The crystallization speed is at the highest level among various engineering plastics, and the crystallinity is also high. Therefore, the non-reinforced heat deformation temperature (under a load of 18.6 kg/cm$^2$) is ranked at the highest level among various engineering plastics. It also has high strength and modulus of elasticity and is also excellent in friction and abrasion resistance and chemical resistance.

However, nylon 46 is not necessarily excellent in blow moldability, particularly in the blow moldability of a large size product. Namely, when nylon 46 is melted at a high temperature, the melt viscosity is too low for blow molding and so-called drawdown is substantial, whereby not only a satisfactory molded product is hardly obtainable, but also the blow molding itself is extremely difficult. For the purpose of increasing the melt viscosity, it is conceivable to increase the molecular weight of nylon 46. As disclosed in U.S. Pat. No. 4,460,762, the molecular weight of nylon 46 is increased by solid polymerization. However the molecular weight decreases substantially during melt processing whereby it is difficult to form a melt having a satisfactory melt viscosity.

Thus, blow moldings has been scarcely applied to nylon 46, although nylon 46 has excellent properties as an engineering plastic.

Under these circumstances, it is an object of the present invention to provide a blow molded nylon 46 product having improved blow moldability and while conserving the excellent heat resistance inherent with polyamide 4.6 products.

For this purpose the present inventors have attempted to increase the melt viscosity by blending nylon 6, nylon 66 or a nylon 6.66 copolymer of a high molecular weight to nylon 46 to such an extent not to impair the heat resistance of nylon 46. However, this method did not give satisfactory results. Namely, when these compositions are melted and extruded, pellets can hardly be cut and the so-called Barus effect is observed, whereby a blow molded product is hardly obtainable.

If nylon 6, nylon 66 or a nylon 6.66 copolymer having a relatively low molecular weight is incorporated instead, the Barus effect is negligible, and the composition can be melted and cut into pellets. However, the melt viscosity is still low, and when subjected to blow molding, the drawdown is substantial, whereby a satisfactory blow molded product can not be obtained.

JP-B-80 41659 discloses a method wherein an ionomer and/or carboxy modified nitrile rubber is incorporated to a polyamide to improve the blow moldability. However, even when this method is applied to nylon 46, the increase of the melt viscosity is still inadequate, and the blow moldability is not adequately improved.

The present inventors have surprisingly found that when a predetermined amount of a modified polyolefin having a certain specific functional group is incorporated to a composition comprising nylon 46 and a high molecular weight nylon 6, nylon 66 or a nylon 6.66 copolymer, the Barus effect during melt extrusion can completely be eliminated, and the composition will have a melt viscosity suitable for blow molding, and yet the impact resistance can be improved without impairing the heat resistance of the blow molded product.

The present invention provides a blow molded nylon 46 product comprising (A) from 40 to 95 parts by weight of nylon 46, (B) from 3 to 40 parts by weight of at least one nylon member selected from the group consisting of nylon 6, nylon 66 and nylon 6.66 copolymers and (C) from 2 to 40 parts by weight of a modified polyolefin having at least one functional group selected from the group consisting of carboxylic acid groups, metal carboxylate groups, acid anhydrides, esters and epoxy groups, with a melt viscosity at 300° C. satisfying the following formulas I and II:

$$5,000 \leq \eta_{300}^{10} \leq 50,000 \quad (I)$$

$$4,000 \leq \eta_{300}^{100} \leq 40,000 \quad (II)$$

where $\eta_{300}^{10}$ is the melt viscosity (poise) at a temperature of 300° C. at a shear rate of 10 (sec$^{-1}$) and $\eta_{300}^{100}$ is the melt viscosity (poise) at a temperature of 300° C. at a shear rate of 100 (sec$^{-1}$), and A+B+C being 100 parts by weight.

The nylon 46 to be used in the present invention is a linear high molecular weight polyamide obtainable by a condensation reaction wherein an adipic acid or its functional derivative is used as the acid component and tetramethylenediamine or its functional derivative is used as the amine component.

The nylon 46 to be used in the present invention may contain other copolymer components within a range not to impair the heat resistance. Such copolymer components include, for example, 6-aminocaproic acid, 11-amino undecanoic acid, 12-amino dodecanoic acid, ε-caprolactam, ω-lauryllactam, hexamethylenediamine, undecamethylenediamine, m-xylylenediamine, adipic aid, azelaic acid, sebacic acid, isophthalic acid and terephthalic acid.

The nylon 46 to be used in the present invention may be produced by any optional method. For example, it is possible to use the nylon 4.6 prepared by the methods disclosed in e.g. U.S. Pat. Nos. 4,408,036 and 4,460,762 and 446,316 and 4,716,214, i.e. a method wherein a prepolymer having a small amount of cyclic terminal groups, is prepared under certain specific conditions and such a prepolymer is subjected to solid polymerization in a steam atmosphere to obtain a high molecular weight nylon 46, or is prepared completely in the melt.

There is no particular restriction as to the degree of polymerization of the nylon 46 to be used in the present invention. However, the nylon 46 preferably has a relative viscosity of from 3.0 to 7.0 as measured on a solution in 96% weight sulfuric acid at a concentration of 1 g/dl at 25° C. If the relative viscosity is lower than 3.0, there will be a drawback that the melt viscosity of the composition tends to be small.

The nylon 6 to be used in the present invention is a polyamide comprising capronamide units as main constituting units. The nylon 66 is a polyamide comprising hexamethyleneadipamide as the main constituting unit. The nylon 6, the nylon 66 and the nylon 6.66 copolymer may be produced by a usual melt polymerization method i.e. a method wherein ε-caprolactam and the salt of hexamethylenediamine with adipic acid, as the starting material, are charged alone or together with water into a polymerization reactor, followed by polymerization at a temperature of from 250° to 300° C. under atmospheric pressure or under elevated or reduced pressure.

With respect to the polymerization degree of the nylon 6, the nylon 66 and the nylon 6.66 copolymer to be used in the present invention, the relative viscosity is preferably within a range of from 2.0 to 6.5 as measured on a solution in 96% weight sulfuric acid at a concentration of 1 g/dl at 25° C. Preferably a polyamide having a relatively high relative viscosity is used to obtain an acceptable melt viscosity of the composition for instance is the relative viscosity at least 3.0 even more preferably at least 4.0.

The modified polyolefin to be used in the present invention is a polyolefin having at least one functional group selected from the group consisting of carboxylic acid groups, metal carboxylate groups, acid anhydrides, esters and epoxy groups.

Specific examples include copolymers of olefin monomers with vinyl monomers having carboxylic acid groups, metal carboxylate groups (modified polyolefins containing metal carboxylate groups can be prepared by reacting modified polyolefins having carboxylic acid groups with an alkali such as NaOH or KOH), acid anhydride esters and epoxy groups, such as an ethylene/acrylic acid copolymer, an ethylene/methacrylic acid copolymer, an ethylene/fumaric acid copolymer, an ethylene/maleic anhydride copolymer, a styrene/maleic anhydride copolymer, an ethylene/propylene/maleic anhydride copolymer, an ethylene/glycidyl methacrylate copolymer and an ethylene/vinyl acetate/glycidyl methacrylate copolymer.

Further, there may be mentioned polyolefins grafted to vinyl monomers having carboxylic acid groups or acid anhydride groups, such as an ethylene-graft-maleic anhydride copolymer, an ethylene/propylene-graft-maleic anhydride copolymer, an ethylene/propylene-graft-acrylic acid copolymer, an ethylene/1-butene-graft-fumaric acid copolymer, an ethylene/1-hexene-graft-itaconic acid copolymer, an ethylene/propylene/1,4-hexadiene-graft-maleic anhydride copolymer, an ethylene/propylenedicyclopentadiene-graft-fumaric acid copolymer, an ethylene/propylene/5-ethylidene-2-norbornane-graft-maleic anhydride copolymer, an ethylene-vinyl acetate-graft-acrylic acid copolymer and a styrene/butadiene-graft-maleic anhydride copolymer. Such modified polyolefins are usually prepared by known methods. For example they can be prepared by known methods disclosed in e.g. JP-B-8408299 and 81.09925.

If the nylon 46 content is less than 40 parts by weight, the heat resistance of the blow molded product tends to be low. Preferably the nylon 46 content is between 50 and 90 parts by weight. Further, if the amount of at least one nylon member selected from the group consisting of nylon 6, nylon 66 and nylon 6.66 copolymers is less than 3 parts by weight, the effect for the improvement of the melt viscosity of the blow molded product tends to be inadequate. If the amount of such a nylon member exceeds 40 parts by weight, the heat resistance of the blow molded product tends to be low. Preferably this amount is between 5 and 35 parts by weight.

If the amount of the modified polyolefin having at least one functional group of the present invention is less than 2 parts by weight, the Barus effect tends to be substancial, whereby a satisfactory blow molded product is hardly obtainable. On the other hand, if the amount of the modified polyolefin exceeds 40 parts by weight, the heat resistance, the strength and the elasticity modulus tend to be substantially low. Further, adhesion of the weld portion of the parison tends to be poor, and the impact resistance tends to be low. Preferably the amount of modified polyolefin is between 5 and 30 parts by weight.

There is no particular restriction as to the manner of mixing the composition which yields the blow molded product of the present invention. Any usual known method may be employed. For instance a method is suitable which comprises uniformly mixing the starting materials in the form of pellets, powder or fine pieces by a high speed stirrer and then melt kneading the mixture by an extruder capable of adequately kneading the mixture. Further it is possible to employ a method wherein the uniformly mixed pellets are not preliminarily kneaded by extrusion but mixed and kneaded directly in the molding machine at the time of the blow molding, followed by molding.

There is no particular restriction as to the blow molding method, and it is possible to employ any conventional blow molding method. Namely, a parison is formed by a usual blow molding machine, and then blow molding is conducted at a suitable temperature.

To the blow molded product of the present invention, other components such as a pigment, a heat stabilizer, an antioxidant, a weather resistant agent or an inorganic reinforcing agent, may be incorporated so long as such an incorporation does not impair the moldability or the physical properties. Glass fiber having a diameter of from 3 to 18 μm is particularly preferred as an inorganic reinforcing agent, since it increases the melt viscosity of the blow molded product and it improves also the strength, the modulus of elasticity and the heat resistance.

The present invention is now illustrated by the following examples and comparative examples, without being limited thereto.

TESTING METHODS

The measurement of the melt viscosity was conducted by the following method.

Measuring machine: flow tester (CFT-500A Model, manufactured by Shimadzu Corporation).
Nozzle: 0.5 mm in diameter, 2 mm in length
Temperature: 300° C.
Shear rate: The shear rate was adjusted within a wide range by changing the load.
Melt viscosity: The shear rate and the melt viscosity were plotted, and the melt viscosities at the shear rate of 10 ($sec^{-1}$) and 100 ($sec^{-1}$) were obtained.

The impact resistance of the blow molded product in the examples and comparative examples was evaluated by the following method:

A beverage container obtained by blow molding having an internal capacity of 1 l and an average wall thickness of about 1.5 mm was filled with water of 0° C. and the opening was closed by a stopper. Then, the container was repeatedly dropped from a height of 0.5 mm with the bottom directed downward to a concrete floor surface, and the number of drops until the container broke was determined. This test was conducted with five containers molded under identical conditions and the evaluation was made on the basis of the average number of drops till breakage.

For the determination of the heat resistance, the same container was used. An empty container was supported at its mouth portion to held the container horizontally and treated for one hour in a hot air constant temperature chamber of 260° C., whereupon the heat resistance was evaluated from the degree of the deformation of the container.

EXAMPLES 1 TO 3 AND COMPARATIVE EXAMPLES 1 TO 3.

The materials used for blending were as follows:
Nylon 46: Relative viscosity 4.0 (KS400, manufactured by DSM company, Netherland).
Nylon 6: Relative viscosity 3.4 (A1030BRT, manufactured by Unitika)
Nylon 66: Relative viscosity 5.2 (A150, manufactured by ICI Company).
Toughmer MC206: ethylene/α-olefi-graft-maleic anhydride copolymer (manufactured by Mitsui Petrochemical Company Limited).

These materials were mixed in the blending ratios given in Table 1, vacuum-dried at 90° C. for 18 hours, melt mixed at 300° C. and extruded by a twin-screw extruder and cut into pellets.

With the composition of Comparative Example 2, the Barus effect was so great that it was impossible to obtain pellets. Other samples were satisfactory cut into pellets. By using the pellets thus obtained, blow molding was conducted at a cylinder temperature of 300° C. In Comparative Examples 1 and 3, the drawdown during blow molding was substantial, and the blow molded products thereby obtained all had nonuniform wall thicknesses. In Examples 1 to 3, blow molding products had uniform wall thickness and were excellent in heat resistance and impact resistance.

EXAMPLES 4 TO 9 AND COMPARATIVE EXAMPLE 4

The starting materials used for blending were as follows:
Nylon 46: Relative viscosity 4.3 (KS400, manufactured by DSM Company, Netherland)
Nylon 66: Relative viscosity 5.2 (A153, manufactured by ICI Company)
Bond fast: Ethylene/glycidyl methacrylate copolymer (manufactured by Sumitomo Chemical Company Limited)
Bondaine: Ethylene/ethyl acryalte/maleic anhydride copolymer (A×8390, manufactured by Sumika CDF Company).

In the same manner as in Examples 1 to 3, the above materials were mixed in the blending ratios given in Table 2, melted, extruded and blow molded. In each of Examples 4 to 9, blow molding was conducted satisfactorily, and the blow molded product showed satisfactory values with respect to both the impact resistance and the heat resistance. In Comparative Example 4, blow molding was conducted satisfactorily, but the bonding at the weld portion of the parison was poor, and the impact resistance was low. Further, the deterioration of the heat resistance was substantial.

TABLE 1

|  |  | Comp. Example 1 | Comp. Example 2 | Comp. Example 3 | Example 1 | Example 2 | Example 3 |
|---|---|---|---|---|---|---|---|
| Blending ratios (wt %) | Nylon 46 | 100 | 60 | 80 | 60 | 60 | 50 |
|  | Nylon 6 | — | 40 | — | 35 | 35 | — |
|  | Nylon 66 | — | — | — | — | — | 20 |
|  | Toughmer MC206 | — | — | 20 | 5 | 5 | 30 |
| Melt viscosity at 300° C. (poise) | Shear rate |  |  |  |  |  |  |
|  | 10 (sec$^{-1}$) | 3000 | — | 3500 | 6000 | 7000 | 7600 |
|  | 100 (sec$^{-1}$) | 2500 | — | 3000 | 5000 | 6200 | 7000 |
| Blow moldability |  | No good | — | No good | Good | Good | Good |
| Impact resistance (number of drops) till breakage) |  | 3 | — | 5 | 7 | 8 | >10 |
| Heat resistance (260° C. × 1 hr) |  | No deformation | — | Small deformation | No deformation | No deformation | No deformation |

|  |  | Examp. 4 | Examp. 5 | Examp. 6 | Examp. 7 | Examp. 8 | Examp. 9 | Comp. Example 4 |
|---|---|---|---|---|---|---|---|---|
| Blending ratio (wt %) | Nylon 46 | 60 | 55 | 60 | 50 | 50 | 55 | 30 |
|  | Nylon 66 | 30 | 30 | 30 | 30 | 30 | 30 | 25 |
|  | Bond first | 10 | 15 | — | — | — | 5 | — |
|  | Bondaine | — | — | 10 | 15 | 20 | 10 | 45 |
| Melt viscosity at 300° C. (poise) | Shear rate |  |  |  |  |  |  |  |
|  | 10 (sec$^{-1}$) | 9700 | 10600 | 8800 | 10200 | 11000 | 11500 | 12000 |
|  | 100 (sec$^{-1}$) | 9000 | 9700 | 8200 | 9300 | 9800 | 10400 | 10800 |
| Blow moldability |  | Good | Good | Good | Good | Good | Good | Good |
| Impact resistance (number of drops till breakage) |  | >10 | >10 | >10 | >10 | >10 | >10 | 3 |
| Heat resistance |  | No de- | No de- | No de- | No de- | No de- | No de- | De- |

TABLE 1-continued

| (260° C. × 1 hr) | formation | formation | formation | formation | formation | formation | formation |

With the blow molded nylon 46 products of the composition of the present invention, the blow moldability was remarkably improved, also the impact resistance was substantially improved without substantial deterioration of the heat resistance.

We claim:

1. A blow molded nylon 46 product comprising
(A) from 40 to 95 parts by weight of nylon 46
(B) from 3 to 40 parts by weight of at least one nylon member selected from the group consisting of nylon 6, nylon 66 and nylon 6.66 copolymers and
(C) from 2 to 40 parts by weight of a modified polyolefin having at least one functional group selected from the group consisting of carboxylic acid groups, metal carboxylate groups, acid anhydrides, esters and epoxy groups, with a melt viscosity at 300° C. satisfying the following formulas I and II:

$$5,000 \leq \eta_{300}^{10} \leq 50,000 \tag{I}$$

$$4,000 \leq \eta_{300}^{100} \leq 40,000 \tag{II}$$

where $\eta_{300}^{10}$ is the melt viscosity (poise) at a temperature of 300° C. at a shear rate of 10 (sec$^{-1}$) and $\eta_{300}^{100}$ is the melt viscosity (poise) at a temperature of 300° C. at a shear rate of 100 (sec$^{-1}$), and A+B+C being 100 parts by weight.

2. A blow molded nylon 46 product according to claim 1, wherein the nylon member (B) has a relative viscosity in a range from 2.0 to 6.5.

3. A blow molded nylon 46 product according to claim 1, wherein the nylon 46 (A) has a relative viscosity in a range from 3.0 to 7.0.

4. A blow molded nylon 46 product according to claim 1, wherein the nylon 46 (A) has a relative viscosity in a range from 3.0 to 7.0 and the nylon member (B) has a relative viscosity in a range from 2.0 to 6.5.

5. A blow molded nylon 46 product according to claim 1, wherein the nylon member (B) has a relative viscosity in a range from 3.0 to 6.5.

6. A blow molded nylon 46 product according to claim 1, wherein the nylon member (B) has a relative viscosity in a range from 4.0 to 6.5.

7. A blow molded nylon 46 product according to claim 1, wherein the nylon 46 (A) has a relative viscosity in a range from 3.0 to 7.0 and the nylon member (B) has a relative viscosity in a range from 4.0 to 6.5.

8. A blow molded nylon 46 product comprising:
(A) from 50 to 90 parts by weight of nylon 46.
(B) from 5 to 35 parts by weight of at least one of nylon 6, nylon 66 and nylon 6.66 copolymers and
(C) from 5 to 30 parts by weight of a modified polyolefin with a functional group of at least one of carboxylic acid, metal carboxylate, acid anhydride, ester and epoxy, wherein, said product has a melt viscosity at 300° C. satisfying the following formulas I and II $$5,000 \leq \eta^{10}_{300} \leq 50,000 \tag{I}$$

$$4,000 \leq \eta^{100}_{300} \leq 40,000 \tag{II}$$

with $\eta^{10}_{300}$ being the melt viscosity at a temperature of 300° C. at a shear rate of 10 (sec$^{-1}$) and $\eta^{100}_{300}$ being the melt viscosity at a temperature of 300° C. at a shear rate of 100 (sec$_{-1}$), and A+B+C being 100 parts by weight.

9. A blow molded nylon 46 product according to claim 8, wherein the nylon member (B) has a relative viscosity in a range from 2.0 to 6.5.

10. A blow molded nylon 46 product according to claim 8, wherein the nylon 46 (A) has a relative viscosity in a range from 3.0 to 7.0.

11. A blow molded nylon 46 product according to claim 8, wherein the nylon 46 (A) has a relative viscosity in a range from 3.0 to 7.0 and the nylon member (B) has a relative viscosity in a range from 2.0 to 6.5.

12. A blow molded nylon 46 product comprising:
(A) from 50 to 90 parts by weight of nylon 46 having a relative viscosity in a range from 3.0 to 7.0;
(B) from 5 to 35 parts by weight of at least one of nylon 6, nylon 66 and nylon 6.66 copolymers having a relative viscosity of between 4.0 and 6.5, and
(C) from 5 to 35 parts by weight of a modified polyolefin with a functional group of at least one of carboxylic acid, metal carboxylate, acid anhydride, ester and epoxy, wherein said product has a melt viscosity at 300° C. of the following formulas I and II:

$$5,000 \leq \eta^{10}_{300} \leq 50,000 \tag{I}$$

$$4,000 \leq \eta^{100}_{300} \leq 40,000 \tag{II}$$

with $\eta^{10}_{300}$ being the melt viscosity (poise) at a temperature of 300° C. at a shear rate of 10 (sec$^{-1}$) and $\eta^{100}_{300}$ being the melt viscosity at a temperature of 300° C. at a shear rate of 100 (sec$^{-1}$) and A+B+C being 100 parts by weight.

* * * * *